(12) United States Patent
Miki

(10) Patent No.: US 7,950,307 B2
(45) Date of Patent: May 31, 2011

(54) BICYCLE BRAKE AND SHIFT OPERATION DEVICE

(75) Inventor: Yoshimitsu Miki, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 1383 days.

(21) Appl. No.: 11/454,193

(22) Filed: Jun. 15, 2006

(65) Prior Publication Data

US 2007/0068314 A1  Mar. 29, 2007

(30) Foreign Application Priority Data

Sep. 15, 2006  (JP) .................................. 2005-268706

(51) Int. Cl.
*F16C 1/10* (2006.01)
*G05G 11/00* (2006.01)
*G05G 13/00* (2006.01)
*F16H 63/42* (2006.01)

(52) U.S. Cl. .................... 74/502.2; 74/489; 116/28.1

(58) Field of Classification Search ........... 74/502.02, 74/489, 473.13, 502.2; 474/80; 116/295, 116/28.1; B62M 25/04

See application file for complete search history.

(56) References Cited

U.S. PATENT DOCUMENTS

| | | | |
|---|---|---|---|
| 5,222,412 A | 6/1993 | Nagano | |
| 5,601,001 A | 2/1997 | Kawakami et al. | |
| 5,632,226 A | 5/1997 | Huang et al. | |
| 5,676,021 A | 10/1997 | Campagnolo | |
| 5,676,022 A | 10/1997 | Ose | |
| 5,701,786 A | 12/1997 | Kawakami | |
| 5,832,782 A | 11/1998 | Kawakami | |
| 6,244,207 B1 | 6/2001 | Chen | |
| 6,564,670 B2 | 5/2003 | Feng et al. | |
| 6,565,466 B2 | 5/2003 | Liu et al. | |
| 6,810,764 B2 | 11/2004 | Chen | |
| 7,117,762 B2 * | 10/2006 | Florczyk et al. | 74/501.6 |
| 7,281,489 B2 * | 10/2007 | Kawakami | 116/28.1 |
| 2002/0020246 A1 | 2/2002 | Campagnolo | |
| 2002/0124678 A1 * | 9/2002 | Chen | 74/502.2 |

FOREIGN PATENT DOCUMENTS

| | | |
|---|---|---|
| EP | 1327576 A2 | 7/2003 |
| EP | 1342654 A2 | 9/2003 |
| EP | 1366981 A2 | 12/2003 |
| WO | WO 03/086849 A1 * | 10/2003 |

* cited by examiner

*Primary Examiner* — Vinh T. Luong
(74) *Attorney, Agent, or Firm* — Jeffer Mangels Butler & Mitchell LLP

(57) ABSTRACT

The bicycle brake and shift operation device is a device mounted on a drop handle of a bicycle, and includes: a bracket, a lever member, a winding body, a positioning mechanism, and a shift position display portion. The bracket is mounted on the drop handle. The lever member is a member that is pivotally supported by the bracket. The winding body is mounted to be rotationally movable on a support shaft provided on the lever member, and engages with a shift cable. The positioning mechanism, supported by the lever member, is a mechanism for positioning the winding body to positions that correspond to a plurality of shift positions of a rear derailleur. The shift position display portion is mechanically interlocked with the rotational movement of the winding body to display shift positions.

12 Claims, 6 Drawing Sheets

BICYCLE BRAKE AND SHIFT OPERATION DEVICE

FIELD OF THE INVENTION

The present invention relates to a bicycle brake and shift operation device, and particularly, to a bicycle brake and shift operation device mounted on a drop handle of a bicycle.

BACKGROUND OF THE INVENTION

Bicycles, particularly those such as road racers with drop handles, are known to be equipped with brake and shift operation devices, which are brake operation devices to which shift operation functions are added (for instance, see Japanese Patent Laid-Open No. 2-225191). A conventional brake and shift operation device comprises: a brake bracket, a lever member pivotally mounted on the brake bracket, and a shift operation mechanism provided on the lever member. In this brake and shift operation device, the lever member comprises: a pivot support portion pivotally mounted around a first axis to the brake bracket, a lever body pivotally mounted around a second axis which differs from the first axis to the pivot support portion, and a shift operation mechanism capable of performing shift operation by pivoting of the lever body around the second axis. In the conventional brake and shift operation device, brake operation is performed by pivoting the lever member including the lever body around the first axis, and shift operation is performed by pivoting the lever body around the second axis.

In brake and shift operation devices of this type, there are those with lever members provided with rotational position sensors that detect positions of rotational movement of a cable winding device provided in the shift operation mechanism to display shift positions of the shift device. Output from this rotational position sensor enables shift positions to be electrically displayed on a shift position display device provided, for instance, on a handle bar.

Since the above-described conventional configuration is capable of displaying shift positions by means of electric signals from the rotational position sensor, display position is not limited, and shift positions can be displayed at a position that is easily viewable from a rider. However, because the conventional configuration is premised on a shift position display device (so-called cycle computer) to be provided by the rider, shift positions could not be displayed unless relatively expensive cycle computers were provided.

The object of the current invention is to enable, in an inexpensive manner, displaying of shift positions with a brake and shift operation device mounted on a drop handle.

SUMMARY OF THE PREFERRED EMBODIMENTS

In accordance with a first aspect of the present invention, there is provided a device mounted on a drop handle of a bicycle, including: a bracket, a lever member, a winding body, a positioning mechanism, and a shift position display portion. The bracket is mounted on the drop handle. The lever member is a member that is pivotally supported by the bracket. The winding body is mounted to be rotationally movable on a support shaft provided on the lever member, and engages with a shift cable. The positioning mechanism, supported by the lever member, is a mechanism for positioning the winding body to positions that correspond to a plurality of shift positions of the shift device. The shift position display portion mechanically interlocks with the rotational movement of the winding body to display shift positions.

In this brake and shift operation device, operation of the lever member enables brake operation, and operation of the positioning mechanism provided on the lever member rotationally moves the winding body to enable shift operation. As the winding body rotationally moves, shift positions are displayed in conjunction with the rotational movement. Since the shift position display portion, which is mechanically interlocked with the winding body, is provided inside the device, it is unnecessary to separately provide a display portion. Therefore, shift positions can be displayed inexpensively in a device mounted on a drop handle.

In accordance with another aspect of the present invention, there is provided a bicycle brake and shift operation device mounted on a drop handle of a bicycle that includes: a bracket, a lever member, a winding body, a positioning mechanism, and a shift position display portion. The bracket is mounted on the drop handle. The lever member is a member that is pivotally supported by the bracket. The winding body is mounted to be rotationally movable on a support shaft provided on the bracket, and engages with a shift cable. The positioning mechanism, supported by the bracket, is a mechanism for positioning the winding body to positions that correspond to a plurality of shift positions of the shift device. The shift position display portion is mechanically interlocked with the rotational movement of the winding body to display shift positions.

In this brake and shift operation device, operation of the lever member enables brake operation, and operation of the positioning mechanism provided on the bracket rotationally moves the winding body to enable shift operation. As the winding body rotationally moves, shift positions are displayed in conjunction with the rotational movement. Since the shift position display portion, mechanically interlocked with the winding body, is provided inside the device, it is unnecessary to separately provide a display portion. Therefore, shift positions can be displayed inexpensively in a device to be mounted on a drop handle.

In preferred embodiments, the shift position display portion has an indicating portion for displaying shift positions. In this case, since the indicating portion will display shift positions, higher visibility of shift positions is achieved.

In other preferred embodiments, the indicating portion pivots around a pivot axis that differs from the support shaft. In this case, since the pivot axis of the indicating portion is different than the support shaft, freedom of design regarding the placement of the indicating portion is increased.

In still other preferred embodiments, the shift position display portion further has a spring member that unidirectionally biases the indicating portion around the pivot axis. In this case, the indicating portion can be moved in both directions using a mechanism that interlocks with the winding body to pivot in only the opposite direction.

In further preferred embodiments, the shift position display portion further has an opening enabling the indicating portion to be visible from the outside. In this case, since an opening is provided, everything except the indicating portion is shielded, thereby emphasizing the indicating portion to ensure visibility from the outside.

In other preferred embodiments, the opening is located anterior to a grip portion of the bracket towards the front of the bicycle when the bicycle brake and shift operation device is mounted in its usage state on the drop handle. In this case, since the opening is located anterior to the grip portion of the bracket towards the front of the bicycle, shift positions can be easily confirmed while gripping the grip portion.

In still further preferred embodiments, the shift position display portion further has a cover member that covers the opening, having a face facing upward when the bicycle brake and shift operation device is mounted in its usage state on the drop handle. In this case, the cover member prevents the indicating portion from being directly exposed to the outside, providing protection thereto. In addition, since the opening has a face facing upwards, the indication portion is visible from above.

In other preferred embodiments, the shift position display portion further has a rotating body mounted to be rotationally movable on the support shaft and rotationally moves in conjunction with the winding body, and the indicating portion interlocks with the rotational movement of the rotating body. In this case, since shift positions are displayed according to the rotation of the rotating body that interlocks with the winding body, instead of the rotation of the winding body, the display position can be placed at a visible position, and the display range can be arbitrarily configured according to the structure of the rotating body.

In still other preferred embodiments, the rotating body has a cam groove formed therein so that the distance from the center of rotation gradually increases, and an engagement portion that engages the winding body. In this case, since the amount of rotation of the rotating body and the amount of pivoting of the indicating portion can be altered, display positions can be equally spaced even if shift positions of the winding body are not aligned at regular intervals in the direction of rotational movement.

In further preferred embodiments, the indicating portion has a pivot support portion that is pivotally supported by the lever member or the bracket, an arm portion that extends from the pivot support portion and has a bent portion for preventing interference with the support shaft, a pointer provided at the other end of the arm portion, and a cam pin, provided at the middle of the arm portion, which engages a cam groove. In this case, since the arm portion is displaced so as to avoid the support shaft, the indicating portion can even be displaced at a location where the support shaft is displaced, making it possible to house the shift position display portion inside the device in a compact manner.

In other preferred embodiments the lateral width of the opening is smaller than the maximum lateral width of the lever member. In this case, the size of the lever member or the bracket will not grow larger even when the opening is provided thereon.

According to the present invention, since a shift position display portion, which mechanically interlocks with a winding body, is provided within the device, there is no need to separately provide a display portion, thereby achieving display of shift positions in an inexpensive manner.

DETAILED DESCRIPTION OF THE PREFERRED EMBODIMENTS

Figure 1:
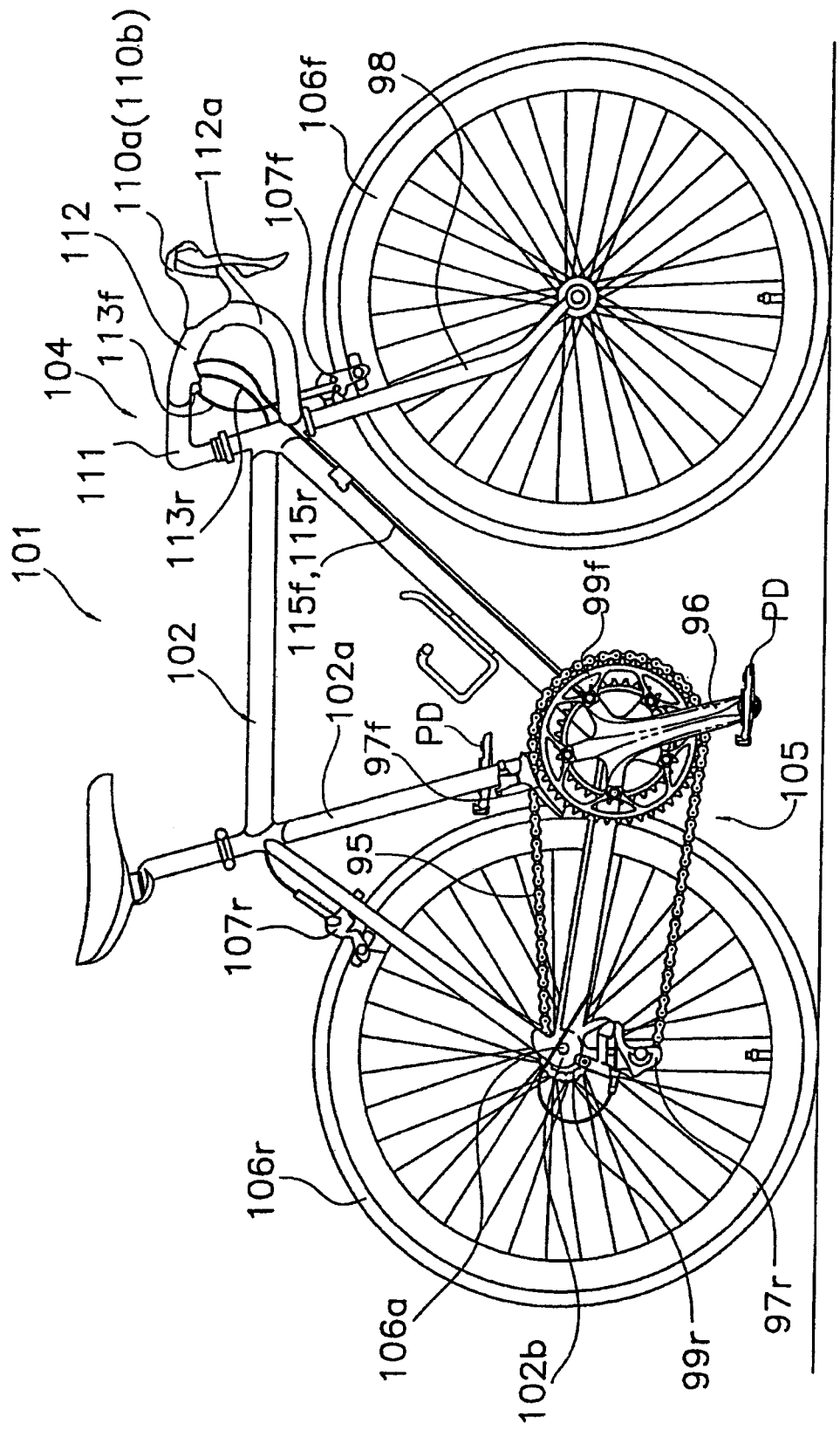
FIG. 1 is a side view of a bicycle employing a first preferred embodiment of the present invention.

In FIG. 1, a bicycle 101 employing an embodiment of the present invention is a road racer comprising: a diamond-shaped frame 102 having a front fork 98; a handle portion 104 fixed to the front fork 98; a drive portion 105 comprised of a chain 95, a crank 96 mounted with a pedal PD, front and rear derailleurs (examples of shift devices) 97$f$ and 97$r$, front and rear sprocket groups 99$f$ and 99$r$ or the like; front and rear wheels 106$f$ and 106$r$, respectively mounted to the front fork 98 and a rear section of the frame 102; front and rear brake devices 107$f$ and 107$r$; and right and left brake and shift operation devices 110$a$ and 110$b$ that operate braking by the front and rear brake devices 107$f$ and 107$r$, as well as shifting by the front and rear derailleurs 97$f$ and 97$r$.

The handle portion 104 is composed of a handle stem 111 and a drop handle 112 fitted and fixed to an upper end of the handle stem 111. The handle stem 111 is fitted and fixed to an upper portion of the front fork 98. The drop handle 112 has, at both ends, a pair of curved portions 112$a$ that are anteriorly bent and curved downwards in U shapes. The right and left brake and shift operation devices 110$a$ and 110$b$ are provided on the curved portions 112$a$. The right and left brake and shift operation devices 110$a$ and 110$b$ are respectively connected to the front and rear brake devices 107$f$ and 107$r$ via Bowden type brake cables 113$f$ and 113$r$, and are also respectively connected to the front and rear derailleurs 97$r$ and 97$f$ via Bowden type shift cables 115$r$ and 115$f$.

As described above, the drive portion 105 includes the chain 95, front and rear derailleurs 97$f$ and 97$r$ that reposition the chain 95, and front and rear sprocket groups 99$f$ and 99$r$. The front derailleur 97$f$ is provided on a seat tube 102$a$ of the frame 102, and is positioned to two shift positions by the left brake and shift operation device 110$b$ to guide the chain 95. The rear derailleur 97$r$ is provided on a rear pawl portion 102$b$ at the rear of the frame 102, and is positioned by the right brake and shift operation device 110$a$ to, for example, ten shift positions and guides the chain 95 thereto.

The front sprocket group 99$f$ comprises two sprockets with different numbers of teeth, disposed side by side in an axial direction of the crankshaft. The rear sprocket group 99$r$ has, for instance, 10 sprockets with different numbers of teeth disposed side by side in an axial direction along a hub shaft 106$a$ of the rear wheel. In this example, in the front sprocket group 99$f$, the inner sprocket has less number of teeth than the outer sprocket. In addition, in the rear sprocket group 99$r$, the number of teeth per sprocket sequentially decreases starting at the innermost sprocket, with the outermost top sprocket having the least number of teeth. The front and rear derailleurs 97$f$ and 97$r$ perform shift operation by moving the chain 95 to either one of the plurality of sprockets. The shift operation is performed by the right and left brake and shift operation devices 110$a$ and 110$b$.

The configuration of the brake and shift operation device will now be described. The relationship between the brake and shift operation devices 110$a$ and 110$b$ are that of mirror images, with the only difference being their number of shift stages. The brake and shift operation device 110$a$, which is normally displaced on the right side of the drop handle 112, will now be described.

Incidentally, the directions of up, down, front, rear, left and right, as used in the claims and in this specification, refer to up, down, front, rear, left and right as mounted onto the bicycle. Left and right are as seen from behind the bicycle.

Figure 2:
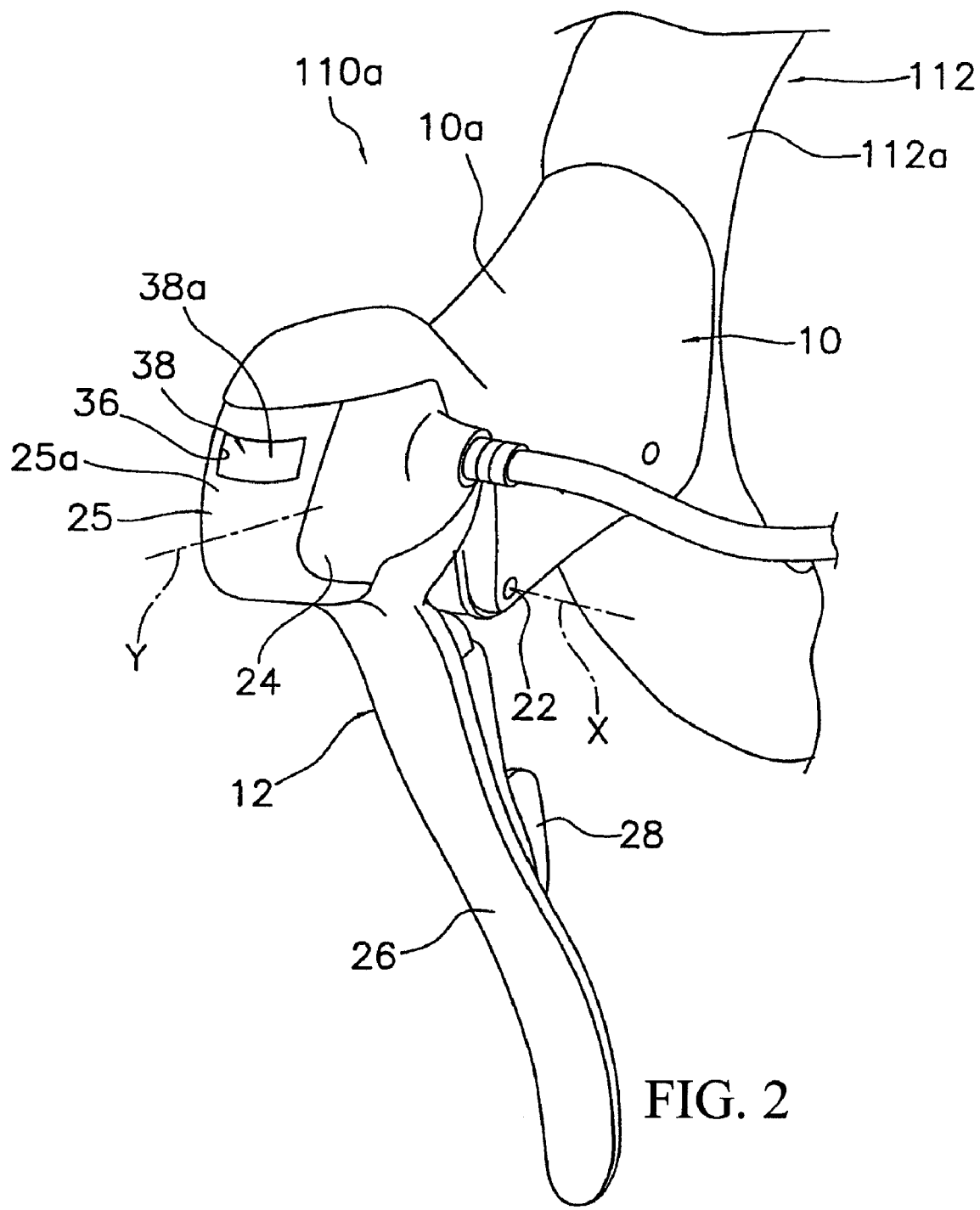
FIG. 2 is a perspective view of the right-side brake and shift operation device.
Figure 3:
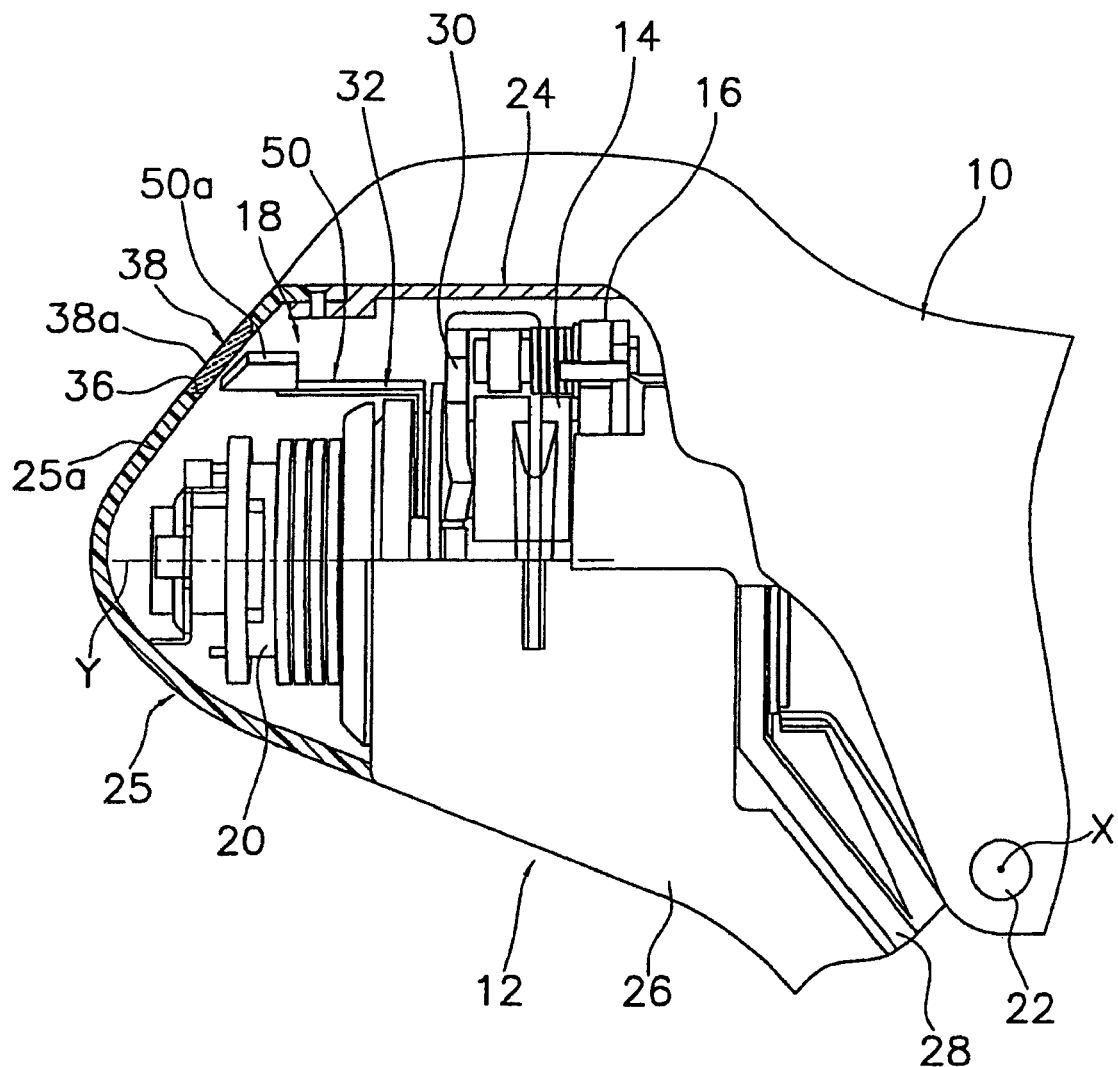
FIG. 3 is a partial cross section of the right-side brake and shift operation device of FIG. 2.

The brake and shift operation device 110a is mounted on to the drop handle 112 of the bicycle, as shown in FIGS. 2 and 3. The brake and shift operation device 110a comprises: a bracket 10 mounted to the drop handle, a lever member 12 pivotally supported by the bracket 10, a winding body 14 supported by the lever member 12, capable of winding the shift cable 115r, a positioning mechanism 16 supported by the lever member 12, and a shift position display portion 18 that displays shift positions of the rear derailleur 97r.

The bracket 10 can be fixed to the curved portion 112a by means of a fixing mechanism, not shown. The surface of the bracket 10 is covered by a soft plastic upper cover, upon which is formed a grip portion 10a that is curved so as to be grippable.

The lever member 12 is pivotally mounted around a first axis X to a pivot shaft 22 that is displaced in a left-right direction of the bracket 10. A brake cable 113f is engaged to the lever member 12, and pivoting of the lever member 12 towards the curved portion 112a of the handle bar 112 moves an inner cable (not shown) of the brake cable 113f, which in turn causes brake operation of the front brake device 107f. The lever member 12 comprises: a lever bracket 24 pivotally mounted around the first axis X to the bracket 10, and a brake lever 26 pivotally mounted around a second axis Y that intersects with the first axis X to the lever bracket 24. A support shaft 20, displaced along the second axis Y, is mounted to the lever bracket 24. A front cover 25 covers the front face of the lever bracket 24. The front cover 25 has a rounded, protruding tip. The front cover 25 has a frontal inclined face 25a that faces obliquely upward. The brake lever 26 is connected to be rotationally movable to the support shaft 20.

The winding body 14 is mounted to be rotationally movable onto the support shaft 20 in a cable winding direction and a cable reeling-out direction. An inner cable of the shift cable 115r is engaged to the winding body 14. The winding body 14 is biased in the cable reeling-out direction by a torsion coil spring, not shown.

The positioning mechanism 16 is for positioning the winding body 14 to positions corresponding to a plurality of shift positions (for instance 10) of the rear derailleur 97r. The positioning mechanism 16 is a mechanism comprising: a positioning body, not shown, which is supported to be rotationally movable by the support shaft 20 and rotationally moves in conjunction with the winding body 14, a positioning pawl for positioning the positioning body, a continuous rotation prevention pawl that prevents continuous rotation of the positioning body in the cable reeling-out direction during release of positioning of the positioning pawl, and a winding pawl that rotationally moves the positioning body in the cable winding direction according to the unidirectional pivoting of the brake lever 26 around the second axis Y. The positioning body has positioning teeth and winding teeth at its outer periphery, where the winding pawl engages the winding teeth, while the positioning pawl and the continuous rotation prevention pawl engage the positioning teeth.

The continuous rotation prevention pawl and the positioning pawl are operated by a release lever (FIGS. 2 and 3) 28, pivotally mounted to the brake lever 26 around an axis that is parallel to the second axis Y. The interval of the positioning teeth in a circumferential direction may not necessarily be constant, since the amount of cable movement per each single shift position of the rear derailleur 97r may vary. Therefore, there may be cases where the angle of rotational movement of the winding body for each shift position varies among the shift positions.

In the positioning mechanism 16 thus configured, pivoting the brake lever 26 inward around the second axis Y causes the winding body 14 to rotate one shift position's worth in the cable winding direction. In addition, by pivoting the release lever 28 around an axis that is parallel to the second axis Y, the winding body 14 will rotate one shift position's worth in the cable reeling-out direction. Positioning mechanisms thus configured, such as that disclosed in Japanese Patent Laid-Open No. 02-225191, which is incorporated herein by reference, are known. Therefore, a detailed description will not be provided herein.

Figure 4:
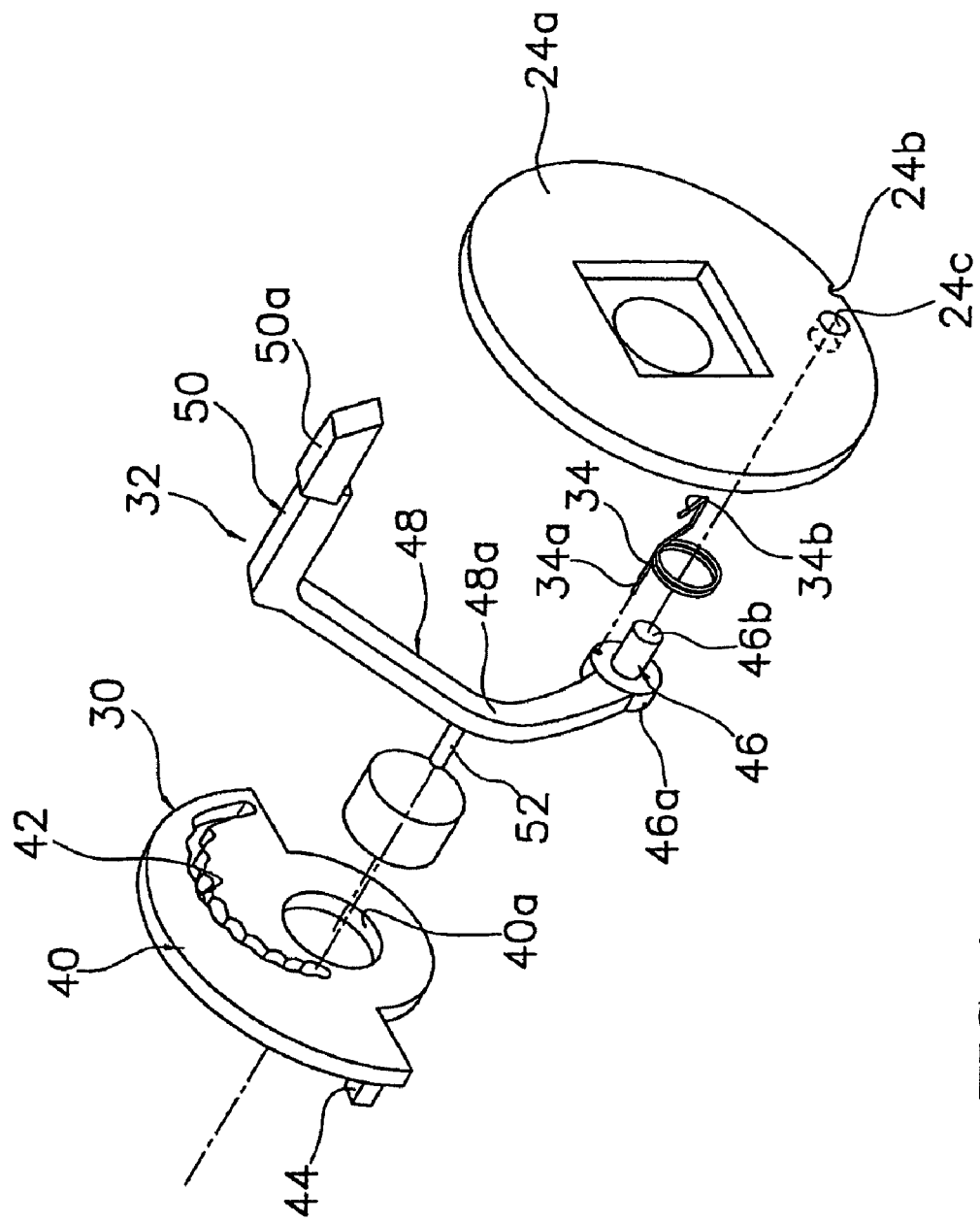
FIG. 4 is an exploded perspective view of the shift position display portion.

The shift position display portion 18 mechanically interlocks with the rotational movement of the winding body 14 to display shift positions of the rear derailleur 97r, and is displaced anterior to the positioning mechanism 16. As shown in FIGS. 3 to 5, the shift position display portion 18 comprises: a rotating body 30 that rotationally moves in conjunction with the rotational movement of the winding body 14, an indicating portion 32 that is interlocked with the rotational movement of the rotating body 30 and pivots around a pivot axis that differs from the rotating body 30 to display shift positions, a biasing member 34 consisting of a spring member such as a torsion coil spring that unidirectionally biases the indicating portion 32 around the pivot axis, an opening 36 which makes the indicating portion 32 visible from the outside, and a cover member 38 that covers the opening 36.

Figure 5A:
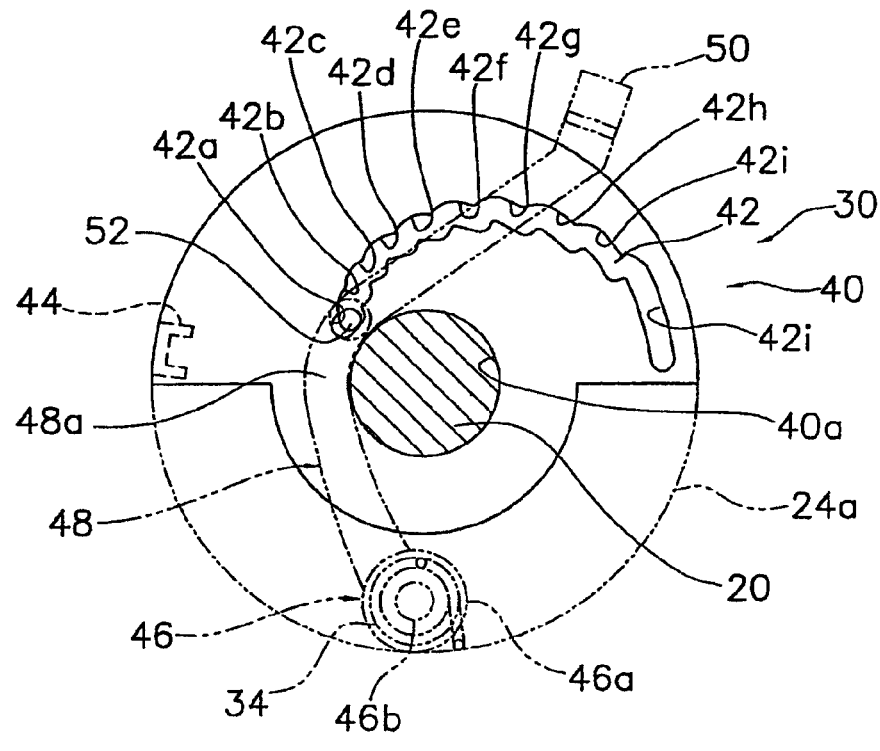
FIGS. 5$a$ and 5$b$ are detailed views showing operation of a rotating body and an indicating portion of the right-side brake and shift operation device of FIG. 2.
Figure 5B:
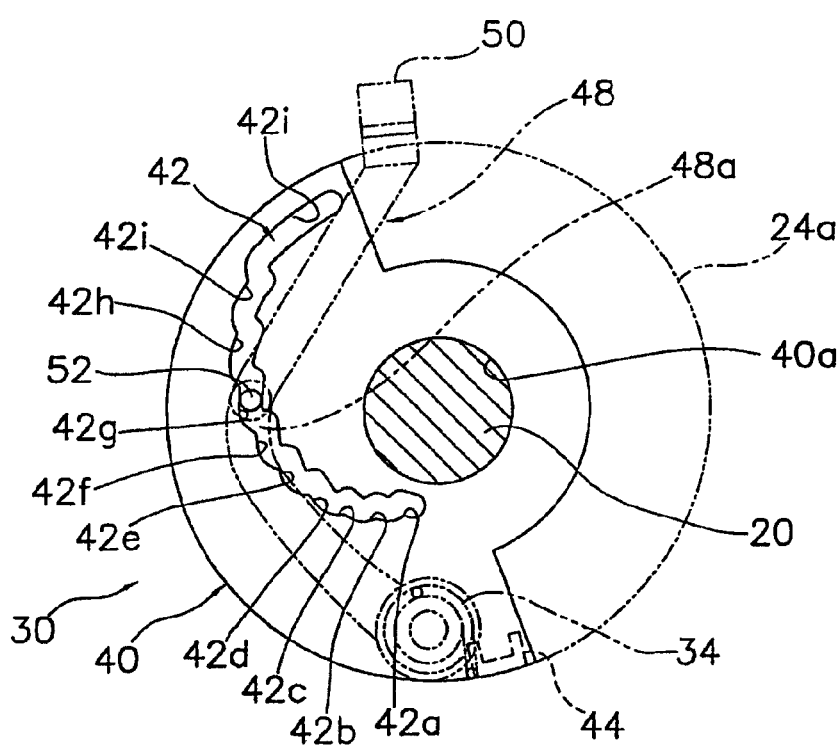

The rotating body 30 comprises: a main body portion 40 pivotally mounted to the support shaft 20, a cam groove 42 formed on the main body portion 40 so that the distance from the center of rotation becomes gradually larger, and an engagement portion 44 for rotating the rotating body 30 in conjunction with the winding body 14. The main body 40 is a substantially half-round plate-like member with its portion to be mounted to the support shaft 20 formed as a circle, and has a through bore 40a formed at the center thereof. As shown in FIGS. 5A and 5B, the cam groove 42 is configured as 10 continuous circular arcs, formed according to the 10 shift positions. More specifically, each circular arc 42a to 42j is formed so that the distance from the center of rotation becomes gradually larger in a 10-step staircase pattern, starting from outwards in the radial direction of the through bore 40a of the main body 40. Each length of the circular arcs 42a to 42j is formed so that the tip (pointer 50) of the indicating portion 32 moves in regular intervals according to shift positions. In this case, the length of the circular arc 42j in a high-speed shift position, corresponding to a radially inward small diameter-side sprocket, is longer than a low-speed shift position, corresponding to a radially outward large diameter-side sprocket. Incidentally, FIG. 5A depicts the position of the indicating portion 32 when it is at the minimum speed shift position that corresponds to the lowermost speed-side sprocket. In addition, FIG. 5B depicts the position of the indicating portion 32 when it is at the shift position corresponding to the seventh-speed sprocket. The engagement portion 44 has, for example, a C-shaped cross section, and extends towards and engages the winding body 14. This allows rotation of the winding body 14 to be conveyed to the rotating body 30.

The indicating portion 32 comprises: a pivot support portion 46 pivotally supported by the lever member 12, an arm portion 48 extending from the pivot support portion 46, a pointer 50 provided at the other end of the arm portion, and a cam pin 52 provided at the middle of the arm portion 48 and engages the cam groove 42.

The support portion 46 comprises a boss portion 46a, and a shaft portion 46b that extends anteriorly from the boss portion 46a. The shaft portion 42b is pivotally mounted to a disk-shaped support member 24a that is nonrotatably mounted to the lever bracket 24 of the lever member 12. The support member 24a is displaced anterior to the rotating body 30, and a support bore 24c for supporting the pivot support portion 46 is formed at its outer periphery side. One end 34a of the biasing member 34 is engaged to the boss portion 46a. The other end 34b of the biasing member 34 is engaged to a recessed portion 24b formed on the support member 24a. In FIGS. 5A and 5B, the biasing member 34 biases the indicating portion 32 in a clockwise direction. Therefore, in FIGS. 5A and 5B, when the rotating body 30 rotates in a clockwise direction, the biasing force of the biasing member 34 pivots the indicating portion 32. When the rotating body 30 rotationally moves in a counter-clockwise direction, the cam groove 42 presses the cam pin 52 to pivot the indicating portion 32.

A bent portion 48a is formed at the middle of the arm portion 48 to avoid interference with the support shaft 20. The cam pin 52 is formed at the bent portion 48a so as to protrude towards the cam groove 42.

The pointer 50 is anteriorly bent, and extends towards the opening 36, as shown in FIG. 3. A tip 50a is thicker then other portions, and is given, for instance, a red color. The colored tip 50a extends from above the opening 36 to a visible position.

As show in FIGS. 2 and 3, the opening 36 is formed in substantially a rectangle on the inclined face 25a, which faces obliquely upwards, of the slightly curved front cover 25. Therefore, the inside of the front cover 25 is visible from above through the opening 36. When the brake and shift operation device 110a is mounted in its usage state to the curved portion 112a of the drop handle 112, the opening 36 is displaced anterior to the grip portion 10a of the bracket 10. The lateral width of the opening 36 is smaller than the maximum lateral width of the lever member 12.

The cover member 38 is a transparent member made of plastic such as polycarbonate. When the brake and shift operation device 110a is mounted in its usage state to the curved portion 112a of the drop handle 112, the cover member 38 has a face 38a that faces upwards.

In the shift position display portion 18 thus configured, shift operation is performed through the brake lever 26 or the release lever 28, and when the winding body 14 rotationally moves in either a cable winding direction or a cable reeling-out direction, the rotating body 30 rotationally moves in conjunction with the rotational movement. Rotational movement caused by the rotational movement of the rotating body 30 causes the cam groove 42 to move, and the cam pin 52 engaging the cam groove 42 pivots the indicating portion 32 to a position corresponding to the shift position. Since the pointer 50 of the indicating portion 32 is visible from above via the cover member 38, a rider can reliably verify shift positions merely by slightly lowering his or her line of vision.

In this case, since the shift position display portion 18 that mechanically interlocks with the winding member 14 is provided inside the brake and shift operation device 110a, a separate display section is no longer necessary. Therefore, in the brake and shift operation device 110a mounted to the drop handle 112, display of shift positions can be achieved in an inexpensive manner.

Figure 6:
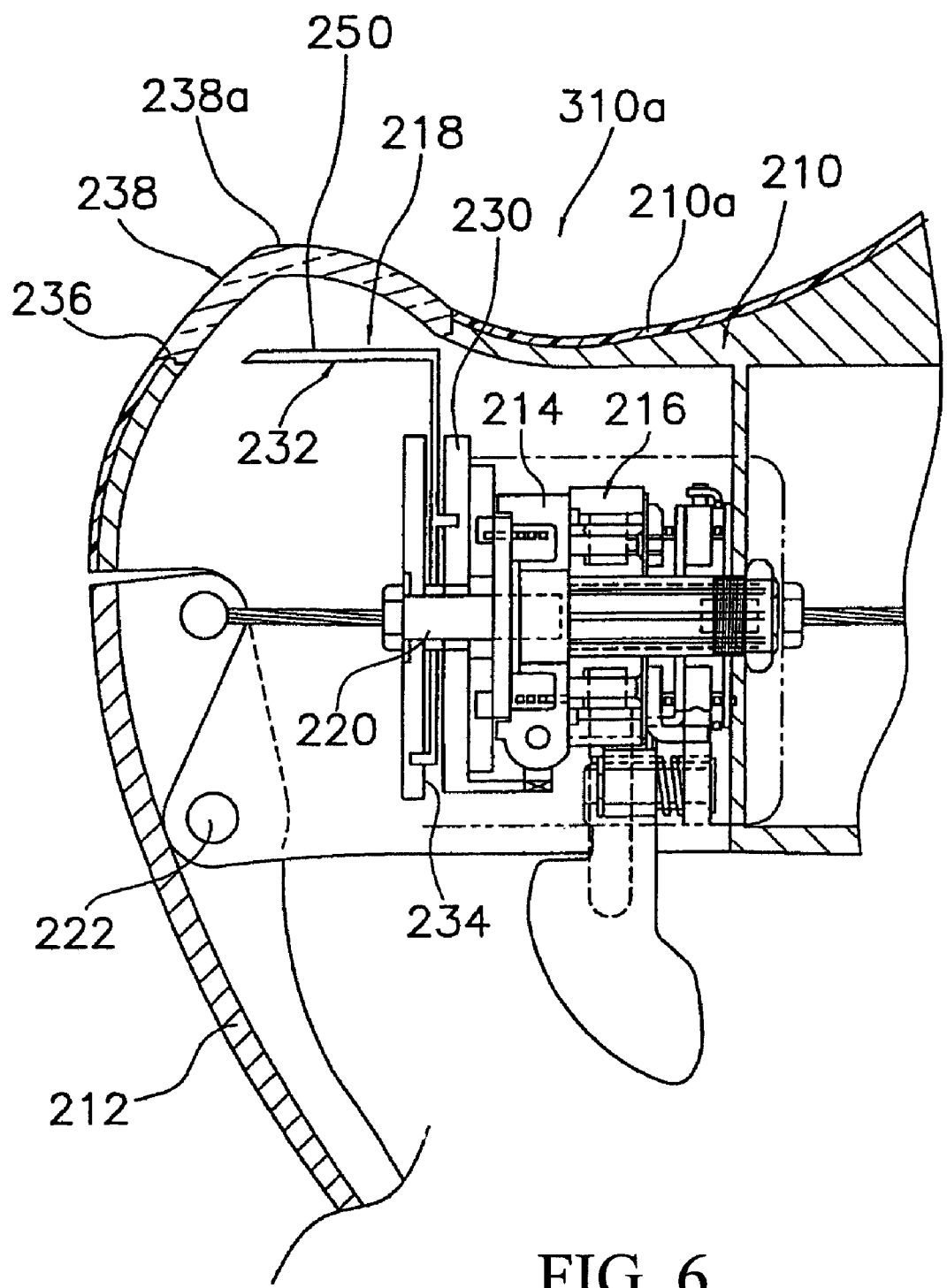
FIG. 6 is a partial cross section of a right-side brake and shift operation device in accordance with a second preferred embodiment of the present invention.

Other Embodiments (a) In the above embodiment, while the winding body 14 and the positioning mechanism 16 were provided at the lever member 12, the present invention is not limited to the above embodiment. In a brake and shift operation device 310a, a winding body 214, a positioning mechanism 216 and a shift position display portion 218 can be provided on a bracket 210, as shown in FIG. 6. More specifically, these are mounted on a support shaft 220 mounted to the bracket 210. The lever member 212 is pivotally mounted to the bracket 210 by a pivot shaft 222. The shift position display portion 218 is mechanically interlocked with the rotational movement of the winding body 214 to display the shifting positions of the rear derailleur 97r, and is displaced anterior to the positioning mechanism 216.

The shift position display portion 218 comprises: a rotating body 230 that rotationally moves in conjunction with the rotational movement of the winding body 214, an indicating portion 232 that is interlocked with the rotational movement of the rotating body 230 and pivots around a pivot axis that differs from the rotating body 230 to display shift positions, a biasing member 234 consisting of a spring member such as a torsion coil spring that unidirectionally biases the indicating portion 232 around the pivot axis, an opening 236 which makes the indicating portion 232 visible from the outside, and a cover member 238 that covers the opening 236. The rotating body 230, the indicating portion 232 and the biasing member 234 are substantially the same as that shown in FIGS. 4 and 5, and the only difference is that they are mounted on the bracket 210 instead of the lever bracket 24. The opening 236 is formed anterior to a grip portion 210a of the bracket 210, and is opened upwards. The pointer 250 of the indicating portion 232 is displaced so as to be entirely visible from the opening 236. The cover member 238 is formed so as to cover the opening 236, and is made of transparent plastic. The cover member 238 has a face 238a that faces upwards.

This embodiment achieves the same advantages as the above-described embodiment.

(b) In the above-described embodiment, while a rotating body interlocked with a winding body was provided, and the rotating body and an indicating portion were connected by a cam mechanism, the interlocking structure of the indicating portion is not limited to the above embodiment. For example, a gear portion may be provided at a portion of the outer periphery of the winding body, and the indicating portion may be configured with a disc-shaped rotational-moving body with a gear portion that meshes with the gear portion of the winding body, provided at a portion of its outer periphery. Then, a pointer or numerals or the like that indicate shift positions may be provided on the remaining portion of the outer periphery of the rotational-moving body, and the pointer or the numerals may be arranged to be visible from an opening.

(c) In the above embodiment, while a cam groove 42 was provided on a rotating body 30 that integrally rotates with the winding body 14, a cam groove may be provided on the winding body 14 to directly engage the cam pin 52 of the indicating section 32.

What is claimed is:

1. A bicycle brake and shift operation device mounted onto a drop handle of a bicycle, comprising:
   a bracket mounted on the drop handle;
   a lever member pivotally supported by the bracket;
   a winding body mounted to be rotationally movable on a support shaft provided on the lever member, to which a shift cable is engaged;
   a positioning mechanism supported by the lever member, for positioning the winding body to positions that correspond to a plurality of shift positions of an associated derailleur; and
   a shift position display portion mechanically interlocked to the rotational movement of the winding body to display the shift positions, wherein the shift position display portion has an indicating portion for displaying shift positions, and wherein the indicating portion pivots around a pivot axis that differs from the support shaft.

2. The bicycle brake and shift operation device according to claim 1, wherein the shift position display portion further has a spring member that unidirectionally biases the indicating portion around the pivot axis.

3. The bicycle brake and shift operation device according to claim 1, wherein the shift position display portion further has an opening enabling the indicating portion to be visible from the outside.

4. The bicycle brake and shift operation device according to claim 3, wherein the opening is located anterior to a grip portion of the bracket towards the front of the bicycle when the bicycle brake and shift operation device is mounted in its usage state on the drop handle.

5. The bicycle brake and shift operation device according to claim 3, wherein the shift position display portion further has a cover member that covers the opening, having a face facing upward when the bicycle brake and shift operation device is mounted in its usage state on the drop handle.

6. The bicycle brake and shift operation device according to claim 3, wherein the lateral width of the opening is smaller than the maximum lateral width of the lever member.

7. The bicycle brake and shift operation device according to claim 1,
wherein the shift position display portion further has a rotating body mounted to be rotationally movable on the support shaft and rotationally moves in conjunction with the winding body; and
the indicating portion is interlocked with the rotational movement of the rotating body.

8. The bicycle brake and shift operation device according to claim 7,
wherein the rotating body has a cam groove formed so that the distance from the center of rotation gradually increases; and
an engagement portion that engages the winding body.

9. A bicycle brake and shift operation device mounted onto a drop handle of a bicycle, comprising:
a bracket mounted on the drop handle;
a lever member pivotally supported by the bracket;
a winding body mounted to be rotationally movable on a support shaft provided on the lever member, to which a shift cable is engaged;
a positioning mechanism supported by the lever member, for positioning the winding body to positions that correspond to a plurality of shift positions of a shift device; and
a shift position display portion mechanically interlocked to the rotational movement of the winding body to display the shift positions, wherein the shift position display portion has an indicating portion for displaying shift positions and a rotating body mounted to be rotationally movable on the support shaft and rotationally moves in conjunction with the winding body, wherein the rotating body has a cam groove formed so that the distance from the center of rotation gradually increases and an engagement portion that engages the winding body, wherein the indicating portion is interlocked with the rotational movement of the rotating body, and
wherein the indicating portion has:
a pivot support portion that is pivotally supported by the lever member;
an arm portion that extends from the pivot support portion and has a bent portion for preventing interference with the support shaft;
a pointer provided at the other end of the arm portion; and
a cam pin, provided at the middle of the arm portion, which engages the cam groove.

10. A brake and shift operation device that is secured to a bicycle drop handle, the brake and shift operation device comprising:
a bracket secured to the drop handle;
a lever member pivotally connected to the bracket, wherein the lever includes a support shaft that defines a first axis;
a winding body rotationally mounted on the support shaft, wherein a shift cable is engaged with the winding body;
a positioning mechanism supported by the lever member, wherein the positioning mechanism is adapted to position the winding body at a plurality of positions that correspond to a plurality of shift positions of an associated derailleur; and
a shift position display portion that is mechanically coupled to the winding body and can display the shift positions
wherein when the lever member is pivoted about the first axis shifting occurs, and wherein the lever member is pivoted in a direction that is substantially parallel to the first axis braking occurs.

11. The brake and shift operation device of claim 10, wherein the shift position display portion has an indicating portion for displaying shift positions.

12. The brake and shift operation device of claim 11, wherein the indicating portion pivots around a pivot axis that differs from the pivot axis of the support shaft.

* * * * *

UNITED STATES PATENT AND TRADEMARK OFFICE
CERTIFICATE OF CORRECTION

PATENT NO. : 7,950,307 B2  
APPLICATION NO. : 11/454193  
DATED : May 31, 2011  
INVENTOR(S) : Yoshimitsu Miki Page 1 of 1

It is certified that error appears in the above-identified patent and that said Letters Patent is hereby corrected as shown below:

Title Page, Item (30) Foreign Application Priority Data should read:

--September 13, 2005   (JP)................................2005-265231--

Signed and Sealed this
Sixteenth Day of August, 2011

David J. Kappos
*Director of the United States Patent and Trademark Office*